Sept. 7, 1926.                  W. T. JAMES                  1,599,089
                                 SCOOTER
                            Filed March 5, 1926
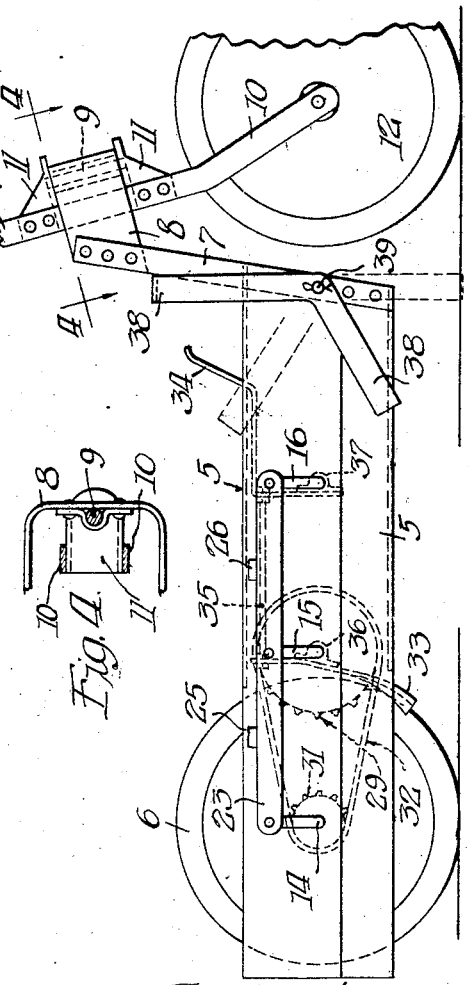
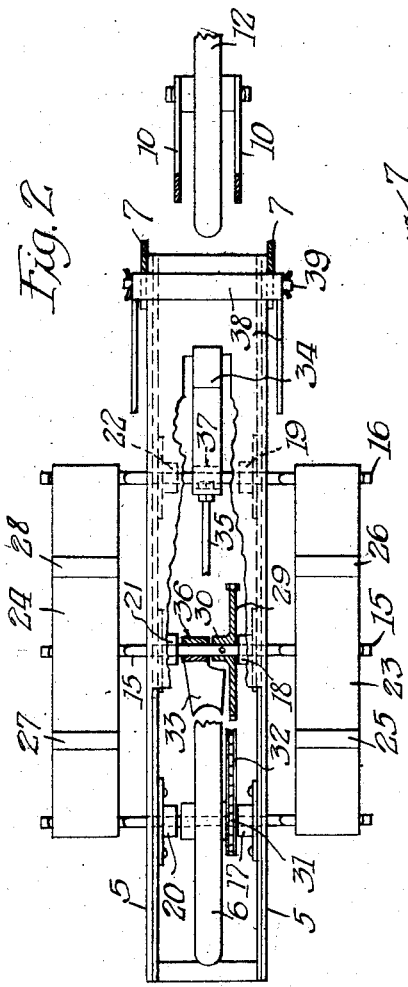
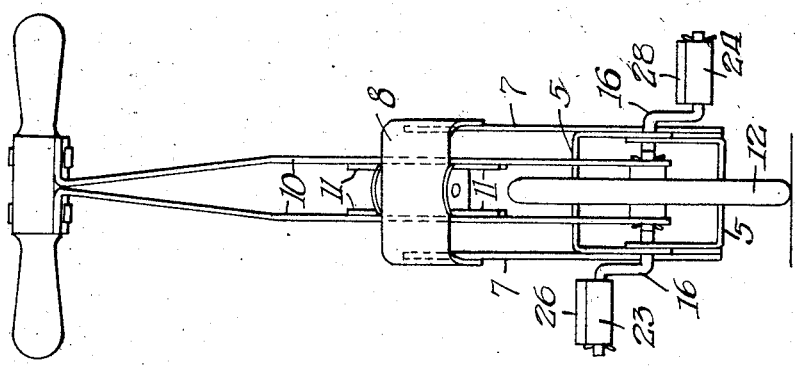
Inventor:
William T. James.

Patented Sept. 7, 1926.

1,599,089

UNITED STATES PATENT OFFICE.

WILLIAM T. JAMES, OF CHICAGO, ILLINOIS.

SCOOTER.

Application filed March 5, 1926. Serial No. 92,601.

My present invention relates in general to a form of play vehicle which may be designated as pedal-mobile, used for exercise, racing, conveying merchandise, etc., having wheels generally located tandem to each other, a platform between the wheels and with operative platforms on the sides to propel the device along the line of movement of which the following is a specification, reference being had therein to the accompanying drawings.

The principal objects of my present invention are the provision of improved means for propelling the vehicle to attain the same objects above stated with more ease, a uniform motion of the feet for one or more riders to attain movement by operating the platform pedals in unison, to use this type of vehicle as a useful carrier of objects to be moved, to be able to move faster with the same expenditure of energy and generally to improve the service and construction of vehicles, together with such further objects as will hereinafter appear.

In attaining the foregoing objects and certain additional advantages to be below disclosed, I have provided the construction illustrated in the accompanying drawings wherein:—

Figure 1 is a longitudinal side elevation of the chassis or supporting frame with box beam enclosing the chain drive with sprockets and wheel brake, with one pedal platform at the high position, the handle at the top for steering, the hinged or pivoted stand for supporting the vehicle in an upright position when not in movement and in a stationary position, with one revoluble wheel on the center of one of the crank shafts, one wheel on the lower end of the inclined steering column and two crank shafts located apart from wheel to support platform pedals longitudinally between and connected to three crank shafts.

Figure 2 is an elevation of inclined steering column with end view of box beam, two pedals in end views opposite each other in revolving positions, one up and one down on crank shafts supporting the platform pedals rigid cross bar handle at top for steering when in movement, and end view of pivoted connection to box beam hangers with surrounding hanger connection within which the steering column swings.

Figure 3 is a plan view of pedal platforms extending between and supported at each end and at the middle on three crank shafts and located on each side of supporting box beam frame with wheel.

Figure 4 is a plan view of pivoted support surrounding the steering column and with ends extended and attached to the hanger bars supporting one end of box beam frame, and the view is shown between the broken ends of steering column in side elevation of Figure 1.

Referring to the drawings, the lower portion of frame is made of two U-shaped side members bent to overlap each other at the sides and forming a connection across the top and bottom to form a box beam and attached by a pivoted joint to the inclined steering column with hanger bars connected to change the direction of vehicle travel, and provided with three crank shafts, one carrying a revoluble wheel driven with sprocket to turn faster than its crank shaft support, and one carrying a driving sprocket with chain drive connection to driven wheel sprocket, and one located to register with the crank shafts in the wheel and drive sprockets, and a platform extending between and connected to all the respective cranks on each side of wheel, comprising two platforms, one on each side of the box beam frame for revolving the drive sprocket wheel by operation of the platform pedals in unison on their respective sides of box frame and opposite to each other on opposite sides of frame. The frame is provided with a foot brake enclosed within the box frame with the sprocket wheels and chains, and a pivoted steering point in advance of the steering column.

Referring now to the characters on the drawing, 5 is the box beam frame extended to one end to the driven wheel 6 and the other end to the hanger bars 7 attached to pivot support 8 to form a pivoted connection to pivot pin 9 with the steering column 10, connected through the pivot pin 9 in column 10 with connecting brackets 11. 12 is the steering wheel in column 10 and 13 is the steering handle. 14, 15 and 16 are crank shafts in ball bearings 17 and 20, 18 and 21, and 19 and 22 respectively. 23 and 24 are pedal platforms on cranks 14, 15 and 16. 25, 26, 27 and 28 are cross bars on the pedal platforms to prevent the rider's feet from slipping. 29 is the driving sprocket on hub 30 which is pinned on crank shaft 15, and 31 is driven sprocket fastened on wheel 6. 32 is the drive chain extending around sprockets to revolve wheel 6 faster than its supporting crank shaft 14. 33 is the brake shoe on wheel 6 operated by the foot lever 34 through connecting rod 35, the brake shoe 33 is pivoted on crank shaft 15 on bearing connection 36 and the foot lever 34 is pivoted on crank shaft 16 attached to bearing 37. 38 is a stand support pivoted on through shaft 39 to hold the vehicle in a stationary position when at rest.

It will be seen that when the platforms are long to carry a number of riders, that the increased number of cranks adds rigidity to the platform pedals and serves to increase their effective operation and uniform movement. Carriers may be provided as shown on my application Serial Number 2,328 filed January 14, 1925.

It will also be clear that any number of crank shafts may be provided for any number of riders as governed by the length of frame.

Having thus described my invention and illustrated its use, what I claim as new and desire to secure by Letters Patent is:

1. A wheel vehicle having a box form of supporting main frame structure with sides for enclosing the operating mechanism and drive wheel of the said vehicle, three crank shafts in alignment on the said structure having a platform connected to the said crank shafts to revolve the said crank shafts in unison.

2. A two wheel vehicle having a box form of supporting main frame structure supported by the said wheels and enclosing the operating mechanism and drive wheel of said vehicle, three crank shafts supported by the said frame structure having two platforms connected to the said crank shafts, one platform connected to one end of said cranks, and one platform connected to the other end of said cranks, and both platforms adapted to revolve the said cranks in unison.

3. A wheeled vehicle having a box form of supporting main frame structure carried by the said wheels one of said wheels within said frame structure, and the said main frame structure having an open space between the sides of the said frame structure, a crank shaft supported between the sides of the said frame structure under the top of the said frame structure, substantially as described.

4. A wheel vehicle having a box form of supporting main frame structure carried by the said wheels, the said main frame structure having an open space and a top between the sides of said structure, and operating mechanism and a drive wheel within the space of the said frame structure for revolving one of said wheels, substantially as described.

5. A two wheel vehicle having a box form of supporting frame structure with sides and top for enclosing the operating mechanism and one of the said wheels, the said frame structure having an open space within the said box frame structure, and operating mechanism within said space for operating the said wheel vehicle, substantially as described.

6. A two wheel vehicle having a supporting box frame structure supported by the said wheels, one of said wheels between the sides of said structure, the said frame structure having an open space between the sides and top within the said frame structure, and a sprocket wheel carried on a shaft within the said space, said shaft being extended across the space between the sides of said frame structure and supported by the said frame structure, substantially as described.

7. A wheel vehicle having a supporting box frame structure supported by the said wheels, the said frame structure having an open space within the said frame structure, a crank shaft being extended across the open space within the said box frame structure, said crank shaft being supported by the sides of said box frame structure, a sprocket wheel being attached to the said crank shaft, a second shaft being extended across the space between the sides of said frame structure, a vehicle wheel revolubly mounted on said second shaft, a sprocket wheel attached to said vehicle wheel, and a sprocket chain connecting the first said sprocket wheel with the sprocket wheel on the said vehicle wheel to revolve said vehicle wheel when the first said crank shaft is revolved, substantially as described.

8. A two wheel vehicle having a supporting hollow frame structure supported by the said wheels, one of said wheels at one end of said hollow frame structure between the sides of said hollow frame structure two crank shafts being extended across the space between the sides of said hollow frame structure, each of said crank shafts carrying a sprocket wheel with chain connection supported by the said wheels, the other of said wheels supported by the steering column of said vehicle by a pivoted joint attached to the supporting frame structure, substantially as described.

9. A two wheel vehicle having a supporting hollow frame structure supported by the said wheels, operating mechanism for propelling the vehicle located within the said hollow space, said operating mechanism having a crank shaft supported by the sides of the said hollow frame structure, a sprocket chain drive attached to said crank shaft, the ends of said crank shaft being extended through the sides of said hollow frame structure to revolve the crank shaft, substantially as described.

10. A two wheel vehicle having a supporting hollow frame structure supported by said wheels, three crank shafts extending across the said hollow space, the said crank shafts supported by the sides of the said hollow frame structure, the cranks on the said crank shafts located on the outside of said hollow space, two platforms attached to the crank ends of said crank shafts, one platform on each side of said frame structure and both platforms adapted to operate as pedals to revolve the said crank shafts in unison, substantially as described.

11. A two wheel vehicle having a supporting frame structure carried by said wheels, three crank shafts supported by the said frame structure, operating mechanism being attached to one of the said crankshafts, two platform pedals connected at the ends of said crank shafts adapted to revolve said crank shafts in unison to revolve one of said vehicle wheels, substantially as described.

12. A two wheel vehicle having a supporting frame structure carried by said wheels, crank shafts supported by the said frame structure, operating mechanism being attached to one of said crank shafts, platform pedals connected at the ends of said crank shafts adapted to revolve said crank shafts in unison, the said platform pedals having cross bars on the platforms, substantially as described.

WILLIAM T. JAMES.